Nov. 23, 1954

O. C. MONTGOMERY 2,695,395

POLARITY TESTING CIRCUIT

Filed Feb. 23, 1951

INVENTOR.
O. C. MONTGOMERY

BY

Hudson & Young
ATTORNEYS

Nov. 23, 1954    O. C. MONTGOMERY    2,695,395
POLARITY TESTING CIRCUIT
Filed Feb. 23, 1951                                2 Sheets-Sheet 2

INVENTOR.
O. C. MONTGOMERY
BY
Hudson & Young
ATTORNEYS

United States Patent Office 2,695,395
Patented Nov. 23, 1954

2,695,395

POLARITY TESTING CIRCUIT

Orin C. Montgomery, Bartlesville, Okla., assignor to Phillips Petroleum Company, a corporation of Delaware Application February 23, 1951, Serial No. 212,454

10 Claims. (Cl. 340—15)

This invention relates to apparatus for determining the polarity of a seismometer of the moving coil type.

In seismic prospecting, a number of seismometers are arranged in a predetermined pattern, and the electrical output of the seismometers, which are representative of seismic waves incident thereon, are fed to a recording station where they appear upon a common chart or recording medium. The waves picked up by the seismometers are produced by detonating an explosive charge at a shot point, the arrival of the reflected and refracted waves at the seismometer stations yielding valuable information concerning the subterranean strata.

The ordinary seismometer used in commercial survey work has a coil which is suspended by springs in a strong magnetic field, relative movement between the coil and the magnetic field-producing structure inducing a current in the coil representative of the seismic waves incident upon the seismometer. As stated, the outputs of several seismometers are recorded upon a common chart. Hence, it is quite important that the coils of all the seismometer units have the same polarity in their connection to the recording galvanometers. If this is not true, the same wave incident upon two adjacent seismometers may produce an upward movement of the recorder trace of one seismometer and a downward movement of the recorder trace of the other seismometer. It is evident that this may seriously impair the intelligibility of the recording and produce serious if not insurmountable difficulties in its interpretation.

I have discovered that a constant current of proper polarity supplied to the coil of a seismometer will cause it to be deflected upwardly whereupon, on interruption of the current, the coil will drop and produce a pulse of current of relatively high amplitude. Conversely, if a current of opposite polarity is supplied to the seismometer, the coil is forced downwardly and, upon interruption of the current, the coil is urged upwardly by its supporting springs producing a pulse of relatively small amplitude. If all the seismometers in an array are so connected so that the coils produce, for example, a pulse of relatively high amplitude when tested in the manner described, the recording galvanometers will be deflected in the same direction by any given seismic impulse. As a result, proper interpretation of the records is assured and no difficulties are encountered due to traces of opposite direction being produced by the same seismic wave.

It is an object of the invention to provide an improved apparatus for determining the polarity of a seismometer of the moving coil type.

It is a further object to provide a novel switch arrangement and pulse indicating unit to indicate seismometer polarity.

It is a further object to provide apparatus which is of simple construction, reliable in operation, and utilizes a minimum number of standard circuit components.

Various other objects, advantages and features of the invention will become apparent from the following detailed description taken in conjunction with the accompanying drawings, in which.

Figure 1:
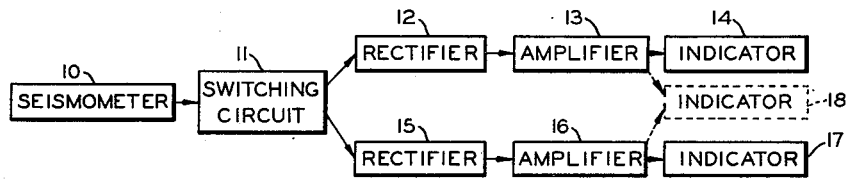
Figure 1 is a block diagram of a preferred embodiment of the invention.

Referring now to Figure 1, a seismometer 10 of the moving coil type has its coil connected to a switching circuit 11 which alternately supplies constant currents of opposite polarities to the seismometer coil. The coil is deflected by each current impulse so that a pulse is produced upon interruption of the current by return of the coil to its original position. Pulses of one polarity pass through a rectifier 12 and an amplifier 13 to an indicator 14 which indicates the magnitude of the pulses of such one polarity. Pulses of opposite polarity pass through a rectifier 15 and amplifier 16 to an indicator 17 which indicates the amplitude of such pulses of opposite polarity. Alternatively, the output of amplifiers 13 and 16 can be fed to an indicator 18 which indicates the relative outputs of the two amplifiers and, hence, relative flow of currents through the rectifiers 12 and 15. In this connection, it will be noted that the indicators 14 and 17, in combination, also afford an indication of the relative flow of currents or pulses through the two rectifiers.

Figure 3:
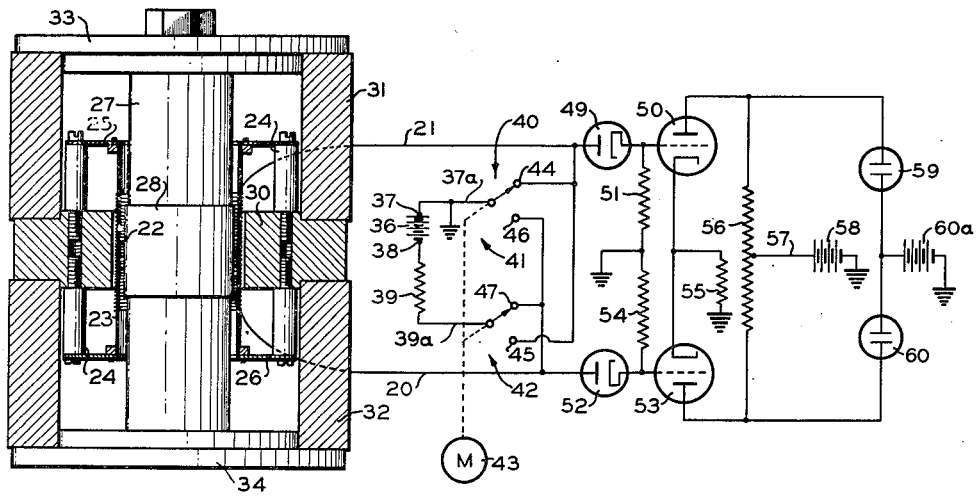
Figure 3 is a schematic circuit diagram corresponding to the block diagram of Figure 1.

Figure 3 is a schematic circuit diagram of a typical embodiment of the block diagram of Figure 1. In this circuit, leads 20 and 21 are connected to the respective terminals of a coil 22 forming a part of a seismometer of the moving coil type. As a typical example of such a seismometer, I have shown in a diagrammatic manner, the essential elements of the seismometer disclosed in Patent 2,487,029 to R. G. Piety entitled "Geophone." In this seismometer, the coil 22 is carried by a light cylinder 23 of plastic material which is mounted on supports 24 by annular springs 25 and 26. A core 27 of magnetic material extends through the cylindrical member 23 and has an enlarged central portion 28 defining one pole piece of a magnetic structure, the other pole piece being defined by an annular member 29 of magnetic material having an enlarged inner section 30 positioned closely adjacent the coil 22. The magnetic structure further includes a pair of annular permanent magnets 31 and 32 of high permeability, a magnetic flux path between the magnets and core 27 being provided by end caps 33 and 34. In this structure, relative movement between the coil 22 and pole pieces 28, 30 resulting from seismic waves induces a current in the coil 22 which appears across output leads 20 and 21, these leads being connected to a recording galvanometer when conducting a seismic prospecting operation.

In accordance with the invention, the circuit of Figure 3 provides alternate direct currents of opposite polarity for application to the coil 22, each period of current application being followed by a period of current interruption during which the deflected coil moves relative to the pole pieces 28, 30 to produce a pulse, the polarity of which is indicative of the polarity of coil 22 with respect to the leads 20 and 21. To this end, a battery 36 or other suitable source of direct current having a positive terminal 37 and a negative terminal 38 is connected in series with a fixed resistance 39. The terminal 37 is connected by a lead 37a to an arm of one unit 40 of a motor-driven switch 41, the other terminal 38 being connected through the resistance 39 and a lead 39a to the arm of another unit 42 of the switch 41, this switch being driven by a motor 43. Fixed switch contacts 44 and 45 are connected to lead 21 while fixed switch contacts 46 and 47 are connected to lead 20.

Lead 21 is connected through a rectifier 49 to the control grid of an amplifier tube 50, the grid being connected to ground through a resistor 51. Similarly, lead 20 is connected through a rectifier 52 to the control grid of an amplifier tube 53, the grid being connected to ground through a resistor 54. The cathodes of tubes 50, 53 are interconnected and the junction thereby formed is connected to ground through a resistor 55. The anodes of amplifier tubes 50, 53 are connected by a resistance 56, this resistance having a center tap 57 which is connected through a battery 58 or other current source to ground. The anodes of the tubes are further connected through indicators 59 and 60, respectively, which are preferably neon tubes, to the positive terminal of a battery 60a, the negative terminal of which is grounded.

In the operation of the circuit of Figure 3, assuming the switch units 40, 42 to be in the positions shown, battery 36 has its positive terminal connected to the seismometer coil through lead 21 and its negative terminal connected to the lower terminal of the seismometer coil through resistor 39 and lead 20, thereby causing a constant current to flow through the coil and producing an upward or downward deflection thereof depending upon the polarity of leads 20 and 21 with respect to the coil. Thereupon, the arm of unit 40 is disengaged from contact 44 and engages contact 46, thereby disconnecting the battery from the seismometer coil and permitting current to flow through resistance 39. If the polarity of leads 20, 21 is such that the coil was deflected upwardly by the battery current, the resultant downward movement of the coil upon interruption of the energizing current produces a relatively large pulse which passes through rectifier 49 to the control grid of tube 50. Accordingly, a flash of light appears at neon tube 59 but not at neon tube 60.

Conversely, if the polarity of the current applied to coil 22 was such that the coil was moved downwardly by application of the battery current, when the current is interrupted, the resulting upward movement of the coil produces a relatively small pulse of opposite polarity to that previously produced. As a result, neon tube 59 is not energized.

Continued operation of motor 43 causes the arm of switch unit 42 to be disengaged from contact 47 and engage contact 45. As a result, a constant current of opposite polarity to that previously described passes through coil 22 and deflects it in a direction opposite to that in which it was previously deflected. Thereupon, the arm of unit 40 is disengaged from contact 46 and engages contact 44 thus interrupting the current flow through the coil and permitting the battery current to flow through resistance 39. If the first described battery current produced an upward movement of the coil and a subsequent brilliant illumination of neon tube 59, the second or last described deflection is in a downward direction so that the resulting return movement of the coil produces a pulse of relatively small amplitude. As a result, there is no illumination of neon tube 59 or 60. Conversely, if the first energization of coil by the battery produced a downward movement thereof with resultant non-energization of neon tubes 59 and 60, the last described energization produces an upward deflection of the coil, the resulting downward movement of which, after interruption of the current, produces a pulse of relatively high amplitude which passes through rectifier 52 and amplifier 53 to cause a brilliant illumination of neon tube 60, neon tube 59 remaining deenergized. Continued movement of motor 43 causes the arm of unit 42 to disengage contact 45 and engage contact 47, thus restoring the circuit to its original condition.

In the foregoing discussion, it will be evident that switch 41 is moved cyclically by motor 43, each cycle of energization including a period when direct current of one polarity is fed to the seismometer coil to deflect same, a period when the current supply is interrupted to permit the coil to return to its normal position and thereby produce a pulse, a period when the coil is energized by direct current of opopsite polarity, and a final period wherein the current supply is again interrupted to permit the coil to return to its neutral position and produce a second pulse. If the coil has one polarity, neon tube 59 is brilliantly illuminated once during each cycle and neon tube 60 remains dark while if the coil has the opposite polarity, neon tube 60 is brilliantly illuminated once during each cycle and tube 59 remains dark.

Figure 5:
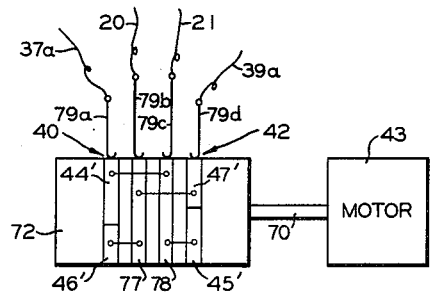
Figure 5 is an elevational view of a motor-driven switch utilized in the circuit of Figure 3.

As previously stated, the unit 40 of switch 41 operates a short interval before unit 42 so that the periods of passage of direct current to the coil are interrupted to permit the coil to return to its neutral position. A convenient form of switch is shown in Figure 5, in which it will be noted that the motor 43 is connected by a shaft 70 to a cylindrical drum 72, this drum being provided with a first contact strip having two sections 44', 46' representing the contact 44, 46 of Figure 3, a second contact strip having two sections 45', 47' representing the contacts 45, 47 of Figure 3, a slip ring 77, and a slip ring 78, slip ring 77 being connected by suitable jumpers to strip sections 46', 47' and slip ring 78 being connected by suitable jumpers to strip sections 44' and 45'. Brushes 79a, 79b, 79c and 79d are provided to withdraw current from the several slip rings and strip sections. Assuming the positive terminal of the battery 36 to be connected to brush 79a by lead 37a and the negative terminal of the battery to be connected to brush 79d through resistor 39 and lead 39a, then brush 79b connects lead 20 with slip ring 77 and sections 46', 47' and brush 79c connects lead 21 with slip ring 78 and sections 44', 45'.

Accordingly, referring to Figure 5, with the parts in the position shown, positive terminal 37 is connected to lead 21 through brush 79a, section 44', slip ring 78 and brush 79c while negative terminal 38 is connected through resistor 39 and lead 39a to lead 20 by brush 79d, section 47', slip ring 77 and brush 79b. As the drum rotates, and brush 79d contacts section 45', the negative terminal 37 is disconnected from lead 20 through section 47' and connected to lead 21 through section 45', slip ring 78 and brush 79c. As a result, the battery discharges through resistor 39 and is disconnected from the seismometer current. Continued rotation of the drum causes brush 79a to engage section 46' with the result that the positive terminal of battery 36 is disconnected from lead 21 and connected to lead 20 through section 46', slip ring 77 and brush 79b, thus causing current of reversed polarity to be supplied to the coil and causing the coil to be deflected in the opposite direction. Rotation of the drum continues until brush 79d again engages section 47', at which time the negative terminal of the battery is again connected to lead 20 with the result that current flow through the coil is stopped and the battery discharges through resistor 39. Shortly thereafter brush 79a again engages section 44', thereby feeding current of the original polarity to the seismometer coil and restoring the initial conditions. Continued operation of the motor produces repeated cycles of operation in the manner already defined.

Figure 4:
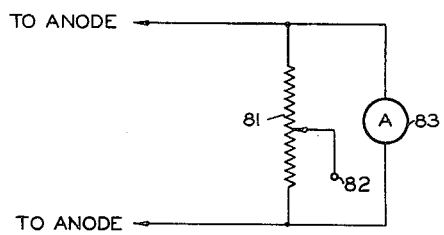
Figure 4 is a schematic circuit diagram of a modified output circuit for the unit of Figure 3.

Referring now to Figure 4, I have shown a modification wherein the circuit connected to the anodes of tubes 50 and 53 is replaced by a circuit including a center-tapped resistance 81 connecting the anodes of the tubes, the tap being supplied by a current from a positive supply terminal 82. The anodes are also connected by an ammeter 83 which may be a galvanometer. This galvanometer ordinarily produces a mid-scale indication. However, if a preponderance of current passes through tube 50, the galvanometer is deflected in one direction corresponding to a given polarity of the leads 20 and 21 in their connection to the seismometer coil. Conversely, if tube 53 receives a preponderance of current, the galvanometer needle is deflected in the opposite direction. Thus, the galvanometer indicates the relative flow of currents through the rectifiers 49, 52 and tubes 50, 53, thereby indicating which rectifier and tube is being supplied with the positive pulses 62 or 69 of high amplitude and, consequently, the polarity of the leads attached to the seismometer coil. This is done electrically in the circuit of Figure 4 rather than manually by observing the relative intensity of the flashes of neon tubes 59, 60 in Figure 3.

Figure 2:
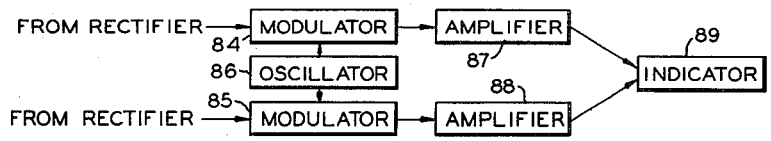
Figure 2 is a block diagram of a modification of the unit of Figure 1.

Referring now to Figure 2, I have shown a modified indicating circuit in block diagram, it being understood that the circuit elements are as indicated in Figures 1 and 3 as far as the rectifiers 12, 15 or 49, 52. In this circuit, a modulator 84 is fed by rectifier 12 or 49 while a modulator 85 is fed by rectifier 15 or 52. An oscillator 86 supplies an alternating voltage of predetermined frequency to the modulators wherein such voltage is mixed with the pulses passing through the rectifiers. This produces a modulated signal which is fed through the respective amplifiers 87 and 88 to indicator 89 which shows the relative flow of currents through the amplifiers, modulators and rectifiers in the same fashion as the circuit of Figure 4. The advantage of using the oscillator-modulator circuit resides in comparative ease of the amplification of the modulated signals and from the fact that a tuned amplifier can be used, thus permitting elimination of undesired pulses and noises which might otherwise interfere with the signals produced in the first part of the circuit.

Figure 6:
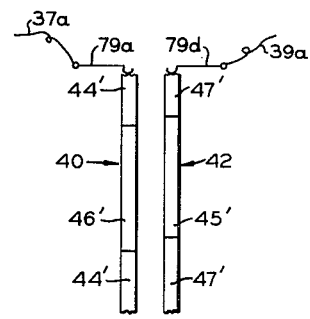
Figure 6 is a developed view of the contact elements of the switch of Figure 5.
Figure 7:
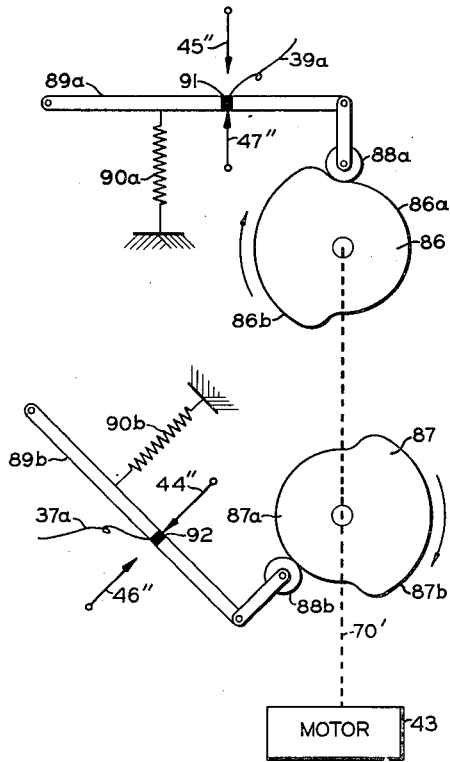
Figure 7 is a perspective view of a cam switch used in certain modifications of the invention.

In still another modification of the invention, the cam switch shown in Figure 7 is substituted for the motor driven drum type switch shown in Figures 6 and 7. This cam switch includes a pair of cams 86 and 87 driven by motor 43 and a shaft 70' corresponding to the shaft 70 of Figure 6. Cooperation with the respective cams are rollers 88a, 88b, pivoted bell crank levers 89a, 89b carrying the cam rollers, and springs 90a, 90b for urging the rollers into engagement with the surfaces of the cam.

The lever 89a cooperating with cam 86 carries a contact 91 which engages a contact 47" when cam roller 88a is positioned upon a low part 86a of the cam, the contact 91 engaging a contact 45" when roller 88a is positioned upon the lobe 86b of the cam. Similarly, the lever 89b cooperating with cam 87 carries a contact 92 which is engageable with fixed contacts 44" or 46" depending upon whether the roller 88b engages a low portion 87a or the lobe 87b of cam 87. It will be understood that contacts 44" and 45" are connected to lead 21 of Figure 3 while contacts 46" and 47" are connected to lead 20 of Figure 3.

In operation, both cams are rotated in a clockwise direction, Figure 7, by motor 43. In the position shown, the positive battery terminal 37, Figure 3, is connected to contact 44", Figure 7, through lead 37a and contact 92 while the negative terminal of the battery is connected through resistance 39, Figure 3, lead 39a and Figure 7, and contact 91 to the fixed contact 47". This corresponds to the original position of the switch 41 in Figures 3, 6 and 7. As the cams rotate, roller 88a moves onto the lobe 86b with the result that contact 91 is disengaged from contact 47" and engages contact 45", thereby disconnecting the negative terminal of the battery from lead 20, Figure 3, and connecting it to lead 21. Thereafter, cam roller 88b, Figure 7, moves onto lobe 87b with the result that contact 92 is disengaged from contact 44" and engages contact 46" with the result that positive terminal of the battery is disconnected from lead 21, Figure 3, and connected to lead 20. Next, roller 88a, Figure 7, moves from the lobe 86b to the low part 86a, thus restoring the initial condition of the contacts 45", 47", and 91 with the result that the negative terminal of the battery is again connected to lead 20, Figure 3. Finally, roller 88b, Figure 7, returns to low part 87a from the lobe 87b with the result that the contacts 44", 46" and 92 are restored to their original position, and the positive terminal of the battery is again connected to lead 21, Figure 3. At this time, the parts have all returned to their original positions in readiness for a new cycle of operation. It will be apparent, therefore, that the cam switch of Figure 7, performs the same function as the motor driven drum switch of Figures 5 and 6.

While the invention has been described in connection with present, preferred embodiments thereof, it is to be understood that this description is illustrative only and is not intended to limit the invention, the scope of which is defined by the appended claims.

I claim:

1. In apparatus for determining the polarity of a seismometer of the moving coil type, a pair of leads adapted to be connected to the seismometer coil, a pair of similarly poled rectifiers connected to the respective leads, a source of direct current, a motor-driven sequence switch operatively connected to said leads and said source of direct current to provide a repeated sequence of operations wherein, during each sequence, the current source is connected to the leads so as to provide a voltage of one polarity, the current is interrupted, the current source is connected to said leads so as to provide a voltage of opposite polarity across said leads, and the current is again interrupted, and pulse-responsive means connected to said rectifiers and indicating the relative flow of currents through said rectifiers.

2. Apparatus in accordance with claim 1 in which the pulse-responsive means includes a pair of amplifier tubes fed by the respective rectifiers, means for supplying operating potentials to the electrodes of said tubes, and a pair of indicators connected in the anode circuits of the respective tubes.

3. Apparatus in accordance with claim 2 in which the indicators are neon tubes.

4. Apparatus in accordance with claim 1 in which the pulse-responsive means includes a pair of vacuum tubes fed by the respective rectifiers, means supplying operating potentials to the electrodes of said tubes, and a meter connected in the anode-cathode circuit of both tubes.

5. Apparatus in accordance with claim 1 in which the pulse-responsive means includes a pair of modulators fed by the respective rectifiers, an oscillator feeding each of said modulators so that pulses received by said modulators from said rectifiers modulate the output of said oscillators, a pair of amplifiers fed by the said modulators, and means indicating the relative outputs of said amplifiers.

6. In apparatus for determining the polarity of a seismometer of the moving coil type, a pair of leads adapted to be connected to the seismometer coil, a pair of similarly poled rectifiers connected to the respective leads, a source of direct current having a positive terminal and a negative terminal, a fixed resistance connected in series with said current source, means including a first switch unit for connecting said positive terminal alternately to said leads and a second switch unit for connecting the negative terminal through said resistance alternately to the opposite leads of said pair, and a motor for driving said switch units in timed relation so that the one unit operates a short interval before the second unit, and pulse-responsive means connected to said rectifiers and indicating the relative flow of currents through said rectifiers.

7. Apparatus in accordance with claim 6 in which the pulse-responsive means includes a pair of amplifier tubes fed by the respective rectifiers, means for supplying operating potentials to the electrodes of said tubes, and a pair of indicators connected in the anode circuits of the respective tubes.

8. Apparatus in accordance with claim 6 in which the pulse-responsive means includes a pair of vacuum tubes fed by the respective rectifiers, means supplying operating potentials to the electrodes of said tubes, and a meter connected in the anode-cathode circuit of both tubes.

9. Apparatus in accordance with claim 6 in which the pulse-responsive means includes a pair of modulators fed by the respective rectifiers, an oscillator feeding each of said modulators so that pulses received by said modulators from said rectifiers modulate the output of said oscillators, a pair of amplifiers fed by the said modulators, and means indicating the relative outputs of said amplifiers.

10. The combination, with a seismometer having a pair of spaced pole pieces, a coil suspended between said pole pieces, and springs mounting said coil for movement between said pole pieces, of a switching device including a pair of leads connected to the respective terminals of said coil, a source of direct current having a positive terminal and a negative terminal, a fixed resistance connected in series with said source, a motor-driven switch connecting the terminals of said source to said leads to provide a repeated sequence of operation wherein, during each sequence, the positive and negative terminals are first connected to one lead through said resistance, the positive terminal is then connected to the other lead, the negative terminal is connected to said other lead, the positive terminal is connected to said one lead and the negative terminal is connected to said one lead.

References Cited in the file of this patent

UNITED STATES PATENTS

| Number | Name | Date |
| --- | --- | --- |
| 1,873,193 | Frenell | Aug. 23, 1932 |
| 2,423,970 | Gardner | July 15, 1947 |
| 2,591,177 | Mayne | Apr. 1, 1952 |
| 2,653,305 | De Shazo | Sept. 22, 1953 |